Nov. 3, 1959     R. A. ROBERTS, JR     2,911,575
SELENIUM AND LIKE RECTIFIER STACK
Filed Sept. 1, 1955
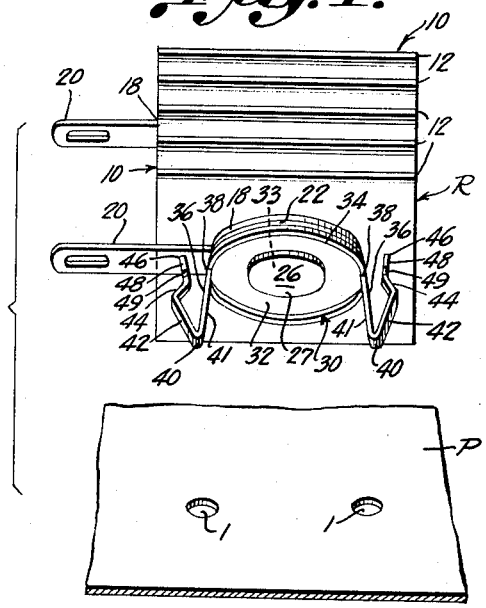
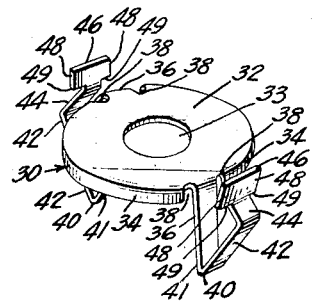
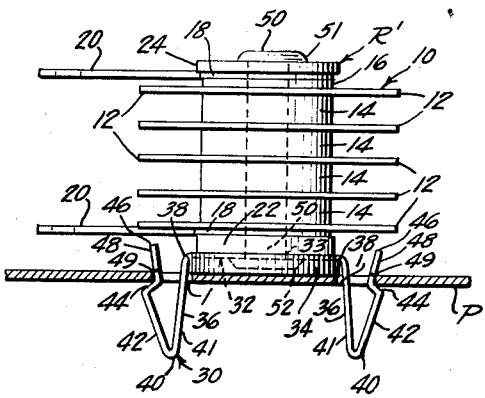
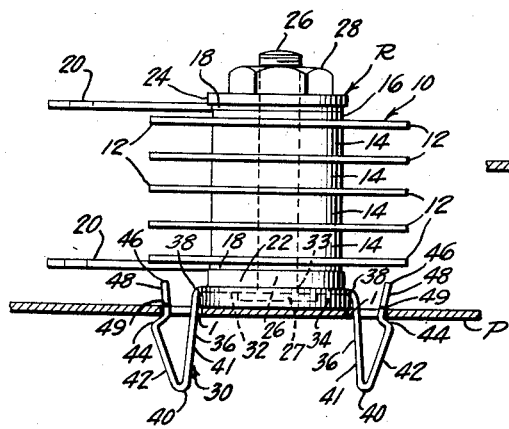
INVENTOR
RAYMOND A. ROBERTS, JR.
BY
*H. G. Lombard*
ATTORNEY

United States Patent Office 2,911,575
Patented Nov. 3, 1959

2,911,575

SELENIUM AND LIKE RECTIFIER STACK

Raymond A. Roberts, Jr., Cleveland, Ohio, assignor to Tinnerman Products, Inc., Cleveland, Ohio, a corporation of Ohio Application September 1, 1955, Serial No. 532,084

6 Claims. (Cl. 317—234)

This invention relates in general to electrical rectifiers such as selenium rectifiers, and the like, composed of a group of stacked plates or discs in spaced relation, and deals, more particularly, with an improved construction for providing such a rectifier as a unit including simple and inexpensive fastening means for mounting the same on a supporting part or panel in the chassis of a radio or television apparatus, for example.

A primary object of the invention is to provide an improved construction for a rectifier stack comprising a group of spaced rectifier plates or discs provided with aligned holes for receiving a stud in the form of a bolt, rivet, eyelet, or the like, serving the dual purpose of retaining the parts of the rectifier stack in assembled relation while also connecting the completed rectifier stack with a fastening device adapted to be secured to an apertured supporting part for mounting the rectifier stack thereon.

Another object of the invention is to provide such a rectifier stack together with a fastening device, as aforesaid, in which said fastening device comprises a resilient stud adapted to be secured by quick and easy snap fastening action to an apertured supporting part to mount the rectifier stack thereon.

A further object of the invention is to provide a rectifier stack as a unit including a fastening device, in accordance with the foregoing, in which said fastening device comprises a pair of spaced resilient studs or stud elements adapted to be received in correspondingly spaced holes in the apertured supporting part to secure said rectifier unit at spaced points in a relatively firm and rigid mounting on said supporting part.

Another object of the invention is to provide a rectifier stack, such as described, and a fastening device therefor in the form of a simple inexpensive sheet metal clip comprising a central base connected to the rectifier stack in a compact assembly and carrying resilient stud means adapted to be secured to an apertured supporting part to mount the rectifier stack thereon, and further, with said resilient stud means preferably comprising a pair of spaced resilient studs adapted to be easily and quickly secured in correspondingly spaced holes in the apertured supporting part in a minimum of time and effort as is necessary for high speed assembly line methods of mass production.

Further objects and advantages, and other new and useful features in the construction, arrangement and general combination of elements and details of construction of the improved rectifier unit including the fastening device for mounting the same in accordance with the invention, will be apparent as the following description proceeds with reference to the accompanying drawings, for purposes of illustration but not of limitation, in which like reference characters designate like parts throughout, and in which:

Fig. 1 is a perspective view of a rectifier unit including a fastening device connected to the underside of the rectifier stack in accordance with the invention, and shows the same in position for securing the fastening device in a pair of spaced holes in a panel or other supporting part to mount the rectifier stack thereon;

Fig. 2 is an elevational view showing the rectifier stack as mounted by the fastening device on the supporting panel, represented in section; and Fig. 3 is a perspective view of the fastening device per se shown employed in Figs. 1 and 2.

Fig. 4 is a view similar to Fig. 2 illustrating the use of another form of stud for securing the rectifier stack and connecting the fastening device thereto.

Referring now, more particularly, to the drawings, Figs. 1 and 2 show an improved rectifier unit R in accordance with the invention as provided with a fastening device for mounting the rectifier stack on a supporting panel or plate or other part P forming a part of the chassis of a radio or television apparatus, for example.

The rectifier stack, designated generally 10, is of the general kind which is composed of a plurality of similar rectifier plates or discs 12 each having a hole or passage therethrough receiving a stud in the form of a tie bolt, tubular eyelet, rivet, or the like, for securing the same in the completed rectifier stack, as presently to be described. The rectifier plates or discs 12 may be of rectangular, round or other suitable shape and preferably are assembled in spaced relation by intermediate metallic spacer washers 14, Fig. 2.

In the present example, the rectifier plates 12 are of the type known as selenium rectifiers which comprise a metal plate or disc onto which is applied a thin layer of selenium together with a barrier layer provided by a barrier layer lacquer or by vapor fuming or other suitable process, and a coating of counter-electrode alloy over the layer of selenium.

While the rectifier plates 12 may be assembled in direct contact, they are preferably provided in superposed spaced relation by the metal spacer washers 14 for more effective dissipation of the heat generated in said plates 12 in the use thereof. Preferably a metal washer 16 is positioned on the top rectifier plate 12, and a pair of similar terminals 18 is provided at the upper and lower ends of the stack thus provided.

The terminals 18 are in direct electrical contact with the outermost rectifier plates 12 and each comprises an apertured disc portion and a radially extending lead 20 having a perforated end for attachment to the wire to be connected thereto, usually by solder. An insulating washer 22 is positioned against the disc portion of the terminal 18 at the lower end of the stack and a similar insulating washer 24 provided on the upper end thereof.

The described elements of the rectifier stack are secured in assembled relation by a stud in the form of bolt 26 having a relatively thin head or clamping element 27 at the lower end of the stack and an elongate shank extending through the aligned holes in the rectifier plates 12, spacer washers 14, terminals 18 and insulating washers 22, 24, with the threaded end of said bolt 26 secured by a nut 28 defining a head or clamping element at the upper end of said rectifier stack 10. The arrangement is such that the bolt 26 or other stud thus secures the parts of the rectifier stack in assembled relation with the head 27 of said bolt also serving as a means connecting the fastening device 30 to the lower end of the rectifier stack, as shown in Figs. 1 and 2.

In a preferred construction, the fastening device 30 is provided as a simple, inexpensive clip device made of sheet metal, preferably spring metal or cold rolled metal having spring-like characteristics. As best seen in Fig. 3, the sheet metal clip 30 is formed with a central disc-like base 32 having an opening 33 receiving the bolt 26 with the bolt head 27 engaging the underside of said base 32. The base 32 preferably is provided with an annular flange or skirt 34 of a height greater than the thickness of the bolt head 27 so that the outer peripheral edge of said flange 34 projects beyond said bolt head 27 in the secured position of said bolt head 27 against the underside of said base 32 of the fastening device. As shown in Fig. 2, the peripheral flange 34, thus provided, serves to space the bolt head 27 from the panel P as necessary to permit said peripheral flange 34 to seat in firm and rigid bearing engagement with said panel P in the fully applied fastening position of said fastening device 30.

The disc-like base 32 of the fastening device, including the peripheral skirt or flange 34, is provided together with two or more strip-like extensions 36 of a width slightly less than the width of the fastener attaching holes 1 provided in the panel or other supporting part P. In the present example, the fastening device is formed with a pair of such extensions 36 in diametrically opposite relation and having substantially T-shaped end sections on the extremities thereof. The strip-like extensions 36 may be so provided as to extend from junctions with the skirt or flange 34 or from junctions with the base 32 through the medium of slots 38 formed in said peripheral skirt or flange 34 at opposite sides of each of said extensions 36, thereby obtaining an advantageous added resilience and greater flexibility in each of said extensions 36 adjoining said base 32.

The strip-like extensions 36 are bent to provide a pair of generally V-shaped resilient shank members 40 each comprising an arm or leg 41 depending from said base 32 and having a return bend defining a cooperating outer spring arm 42. The arms 41, 42, of said shank members 40 taper to leading ends which are smaller than the associated holes 1 in the panel P so as to be readily received in said holes 1 in the initial step of applying the fastening device to fastening position. The outer spring arms 42 extend outwardly in diverging relation and define guide surfaces normally spaced from the cooperating inner arms 41 a distance greater than the width of the holes 1 in the panel P but capable of yielding as necessary to pass into said holes 1. The diverging guide surface on each spring arm 42 leads to a shoulder 44 preferably provided by an inwardly bent portion defining a cam shoulder inclined upwardly and inwardly and merging with an enlarged free end section 46 comprising lateral projections 48 defining abutments or stops 49 on the lower edges thereof.

The abutments 49 on the lateral projections 48 are provided in such relation to the adjoining cam shoulder 44, that in the applied fastening position of each shank member 40 in its hole 1 in the panel P, said abutments 49 engage marginal portions of said hole 1 at one side of the panel P when the cam shoulder 44 passes through said hole 1 and automatically rides outwardly against the lower corner edge of said hole 1 at the opposite side of said panel P to the most effective fastening position in said hole 1. The shoulders 44 may be provided in any other suitable way by stamped tabs or tongues, or the like, and in a more pronounced formation, if desired, to engage material portions of the undersurface of the panel P adjacent the holes 1 for a positive lock of the shank members 40 in secured position in said holes 1. However, the provision of such shoulders 44 in the manner of cam shoulders, as shown, is advantageous in that these cam shoulders adapt the clip or fastening device 30 for effective attachment to panels of different thicknesses, within limits, and otherwise provide for an axial drawing action on the spring arms 42 to seat the same firmly and rigidly in secured position in the holes 1 in the panel P.

The completed rectifier unit R appears substantially as shown in Fig. 1 with the bolt 26 extending through the opening 33 in the base 32 of the fastening device 30 and through the aligned openings in the elements of the rectifier stack 10, as aforesaid. The bolt head 27 engages the underside of the base 32 of the fastening device 30 in concealed relation within the peripheral flange 34 to connect said fastening device 30 to the lower end of the rectifier stack 10, and the completed unit is secured by the nut 28 threaded on the projecting end of the bolt 26 at the upper end of said rectifier stack 10. The bolt 26 or similar stud, accordingly, serves the dual purpose of securing the elements of the rectifier stack 10 and connecting the fastening device 30 thereto to provide the completed rectifier unit R.

The rectifier unit R, Fig. 1, thus provided, is readily adapted to be easily and quickly mounted on the panel P by applying the pair of spaced shank elements 40 to the holes 1 in the panel P which are provided in a predetermined size and spacing corresponding to the position of engagement therein of the spring arms 42 of the fastening device in compressed tensioned relation. The holes 1 in the panel P preferably are circular, as shown, but may be provided as rectangular slots, or the like, or in any equivalent construction in which a single slot in the panel defines a pair of opposite edges or walls having the proper spacing for engagement by the spring arms 42 of the fastening device.

In securing the fastening device 30 on the panel P, the shank members 40 are readily inserted in the holes 1 inasmuch as the leading ends of said shank members are considerably smaller than said holes 1 for this purpose, as aforesaid. As said shank members 40 are advanced axially into said holes 1, the diverging outer spring arms 42 serve as diverging guide surfaces having a gradual camming engagement against the adjacent edges of said holes 1 which causes a gradual inward compression of said spring arms 42 toward the inner arms 41 as necessary to permit the cam shoulders 44 to pass through said holes 1 and snap into fastening engagement with the lower corner edges of said holes 1 and the marginal portions of the panel adjacent thereto. In this relation, the inherent resiliency of the compressed spring arms 42 causes the same to spring outwardly and force the cam shoulders 44 to ride outwardly on said lower corner edges of the holes 1 to their positions of most effective fastening engagement in said holes 1. The arrangement, otherwise, is such that the spring arms 42 remain compressed when fully applied in the holes 1 so that the cam shoulders 44 thereon are under continuously effective spring tension in said positions of most effective fastening engagement in said holes 1.

The axial insertion of the shank members 40 in the holes 1 is limited by the engagement of the peripheral edge of the flange or skirt 34 with the upper surface of the panel P between said holes 1 at the position in which the cam shoulders 44 are seated in their most effective fastening engagement in said holes 1, as aforesaid. Accordingly, in the fully applied fastening position of the fastening device 30, the peripheral edge of the flange or skirt 34 seats in flush uniform bearing engagement with the upper surface of said panel P between the holes 1 while the cam shoulders 44 engage the lower corner edges of said holes 1 and the undersurface of said panel adjacent said holes to secure the shank members 40 against axial displacement in either direction, thereby providing a firm and rigid completed mounting of the rectifier unit R on the panel P, substantially as shown in Fig. 2. Preferably the abutments 49 on the lower edges of the lateral projections 48 are so provided as to bear on the marginal portions of the holes 1 when the cam shoulders 44 are secured therein, as aforesaid, thereby rigidifying said cam shoulders 44 in secured position in said holes 1 in a manner to add to and increase the strength and rigidity of the completed mounting of said rectifier unit R.

Removal of the rectifier unit R from mounted position on the panel P, when necessary, is easily and quickly effected simply by applying a suitable tool such as a pair of thin-nosed pliers to compress the end sections 46 toward each other for moving the outer spring arms 42 inwardly as necessary for the cam shoulders 44 thereon to disengage from the holes 1 in the panel P and thereby permit said shank members 40 to be withdrawn from said holes 1. When the pressure on said end sections 46 is removed, the spring arms 42 automatically assume their normal untensioned relation in the initial form of the fastening device 30, and thus are ready for application to mount the rectifier unit R on the panel P in a repetition of the foregoing described procedure.

Fig. 4 illustrates another rectifier unit R' in accordance with the invention which is similar to that of Figs. 1–3, inclusive, and in which the stud having the dual purpose of securing the elements of the rectifier stack 10 and connecting the fastening device 30 thereto, is in the form of a metal eyelet 50 or similar tubular or solid rivet or core that has its ends peened or otherwise enlarged to define clamping elements or heads 51 and 52 at the upper and lower ends, respectively, of the rectifier stack 10. The lower head or clamping element 52 engages the underside of the base 32 of the fastening device 30 in concealed relation within the peripheral flange 34 to connect said fastening device to the lower end of the rectifier stack 10, while the head or clamping element 51 at the upper end of the rectifier stack 10 cooperates with said lower head 52 in securing the various parts of the completed rectifier unit R'. This form of the invention, otherwise, is provided in the construction described with reference to Figs. 1–3, inclusive, and has the same purpose, application and use.

The fastening device 30 in either form of the invention preferably is constructed of relatively thin sheet metal the thickness of which is selected according to service requirements and the predetermined size of the rectifier stack to be mounted thereby. The fastening device is most effective when provided of spring metal suitably tempered and otherwise treated to give the desired toughness and hardness. The fastening device also may be made from cold rolled metal such as cold rolled steel which is untempered but of a spring metal nature capable of providing an effective and reliable fastening device as and for the purposes described.

While the invention has been described in detail with specific examples, such examples are intended as illustrations only inasmuch as the invention fully contemplates any modification which may be provided within the spirit and scope of the invention.

What is claimed is:

1. A rectifier unit comprising a rectifier stack including a plurality of stacked plates having aligned openings, a fastening device at one end of said rectifier stack comprising a piece of sheet metal providing a base having an opening aligned with said aligned openings in said stacked plates of the rectifier stack, a stud extending through said aligned openings in said stacked plates and said base of the fastening device, said stud having clamping elements at opposite ends thereof securing said rectifier stack and connecting said base of the fastening device thereto, said fastening device comprising at least one resilient shank member projecting outwardly from said base thereof and receivable in an associated hole in a supporting part to secure the rectifier stack in mounted position on said supporting part, said shank member having means to prevent inadvertent axial displacement of the rectifier stack in either direction when the stack is in mounted position on the supporting part.

2. A rectifier unit comprising a rectifier stack including a plurality of stacked plates having aligned openings, a fastening device at one end of said rectifier stack comprising a piece of sheet metal providing a base having an opening aligned with said aligned openings in said stacked plates of the rectifier stack, a stud extending through said aligned openings in said stacked plates and said base of the fastening device, said stud having clamping elements at opposite ends thereof securing said rectifier stack and connecting said base of the fastening device thereto, said fastening device comprising a flange on said base projecting outwardly therefrom beyond the clamping element connecting said base to the rectifier stack, and at least one resilient shank member projecting outwardly from said base and receivable in an associated hole in a supporting part to secure the rectifier stack in mounted position on said supporting part, said shank member having means to prevent inadvertent axial displacement of the rectifier stack in either direction when the stack is in mounted position on the supporting part.

3. A rectifier unit comprising a rectifier stack including a plurality of stacked plates having aligned openings, a fastening device at one end of said rectifier stack comprising a piece of sheet metal providing a base having an opening aligned with said aligned openings in said stacked plates of the rectifier stack, a stud extending through said aligned openings in said stacked plates and said base of the fastening device, said stud having clamping elements at opposite ends thereof securing said rectifier stack and connecting said base of the fastening device thereto, said fastening device comprising a plurality of strips defining a plurality of spaced shank members projecting outwardly from said base, at least one of said shank members comprising an arm depending from said base and carrying a spring arm, said spaced shank members being adapted to be secured to an apertured supporting part to mount the rectifier stack thereon, said spring arm having means to prevent inadvertent axial displacement of the rectifier stack in either direction when the stack is in mounted position on the supporting part.

4. A rectifier unit comprising a rectifier stack including a plurality of stacked plates having aligned openings, a fastening device at one end of said rectifier stack comprising a piece of sheet metal providing a base having an opening aligned with said aligned openings in said stacked plates of the rectifier stack, a stud extending through said aligned openings in said stacked plates and said base of the fastening device, said stud having clamping elements at opposite ends thereof securing said rectifier stack and connecting said base of the fastening device thereto, said fastening device comprising a pair of elongate strips defining a pair of spaced shank members each comprising an arm projecting outwardly from said base and carrying a spring arm provided with a shoulder for preventing inadvertent axial displacement of the stack in one direction, said spaced shank members being adapted to be secured to an apertured supporting part to mount the rectifier stack thereon.

5. A rectifier unit comprising a rectifier stack including a plurality of stacked plates having aligned openings, a fastening device at one end of said rectifier stack comprising a piece of sheet metal providing a base having an opening aligned with said aligned openings in said stacked plates of the rectifier stack, a stud extending through said aligned openings in said stacked plates and said base of the fastening device, said stud having clamping elements at opposite ends thereof securing said rectifier stack and connecting said base of the fastening device thereto, said fastening device comprising a peripheral flange on said base projecting outwardly therefrom beyond the clamping element connecting said base to the rectifier stack, a pair of strips joined to said base and defining a pair of spaced shank members each comprising an arm projecting outwardly from said base and carrying a spring arm provided with a shoulder for preventing inadvertent axial displacement of the stack in one direction, said spaced shank members being adapted to be secured to an apertured supporting part to mount the rectifier stack thereon.

6. A rectifier unit comprising a rectifier stack including a plurality of stacked plates having aligned openings, a fastening device at one end of said rectifier stack comprising a piece of sheet metal providing a base having an opening aligned with said aligned openings in said stacked plates of the rectifier stack, a stud extending through said aligned openings in said stacked plates and said base of the fastening device, said stud having clamping elements at opposite ends thereof securing said rectifier stack and connecting said base of the fastening device thereto, said fastening device comprising a peripheral flange on said base projecting outwardly therefrom beyond the clamping element connecting said base to the rectifier stack, a pair of strips joined to said base each having a T-shaped section on the free end thereof, said strips defining a pair of spaced shank members each comprising an arm projecting outwardly from said base and carrying a spring arm provided with a shoulder facing said T-shaped section, said spaced shank members being adapted to be secured to an apertured supporting part to mount the rectifier stack thereon, said T-shaped section and said shoulder coacting with said supporting part to prevent inadvertent axial displacement of the stack in either direction when the same is mounted on the supporting part.

References Cited in the file of this patent

UNITED STATES PATENTS

| | | |
|---|---|---|
| 2,167,270 | Woodward | July 25, 1939 |
| 2,520,725 | Judd | Aug. 29, 1950 |
| 2,570,514 | Boltuch | Oct. 9, 1951 |
| 2,665,399 | Lingel | Jan. 5, 1954 |
| 2,712,102 | Bacon | June 28, 1955 |
| 2,747,167 | Parrish | May 22, 1956 |
| 2,798,271 | Flora | July 9, 1957 |